US012738614B2

(12) United States Patent
Shi et al.

(10) Patent No.: US 12,738,614 B2
(45) Date of Patent: Sep. 15, 2026

(54) ELECTROLYTE INJECTION APPARATUS AND ELECTROLYTE INJECTION METHOD

(71) Applicant: CONTEMPORARY AMPEREX TECHNOLOGY (HONG KONG) LIMITED, Hong Kong (CN)

(72) Inventors: Qiming Shi, Ningde (CN); Zhiming Wang, Ningde (CN); Caixia Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 105 days.

(21) Appl. No.: 18/515,268

(22) Filed: Nov. 21, 2023

(65) Prior Publication Data

US 2024/0088536 A1 Mar. 14, 2024

Related U.S. Application Data

(63) Continuation of application No. PCT/CN2022/124087, filed on Oct. 9, 2022.

(30) Foreign Application Priority Data

Oct. 19, 2021 (CN) ........................ 202111215135.6

(51) Int. Cl.
*H01M 50/618* (2021.01)

(52) U.S. Cl.
CPC ................................ *H01M 50/618* (2021.01)

(58) Field of Classification Search
CPC ............ H01M 10/058; H01M 50/618; H01M 4/0404; H01M 4/04; H01M 10/052;
(Continued)

(56) References Cited

U.S. PATENT DOCUMENTS 2,810,776 A * 10/1957 Solomon ............ H01M 50/609 141/331
5,961,671 A * 10/1999 Guindy .............. H01M 4/0404 134/95.2

(Continued)

FOREIGN PATENT DOCUMENTS

CN 1705147 A 12/2005
CN 102834951 A 12/2012

(Continued)

OTHER PUBLICATIONS

International Search Report mailed on Dec. 22, 2022, received for PCT Application PCT/CN2022/124087, filed on Oct. 9, 2022, 4 pages including English Translation.

(Continued)

*Primary Examiner* — Christopher M Afful
(74) *Attorney, Agent, or Firm* — XSENSUS LLP

(57) ABSTRACT

This application relates to the field of battery manufacturing technologies, and in particular, to an electrolyte injection apparatus and an electrolyte injection method. The electrolyte injection apparatus includes an electrolyte injection assembly, a gas extraction assembly, and a gas injection assembly. The electrolyte injection assembly has an electrolyte injection end, the electrolyte injection end being configured to communicate with an inner cavity of the housing. The gas extraction assembly has a gas extraction end, the gas extraction end being configured to communicate with the inner cavity of the housing. The gas injection assembly has a gas inlet and a gas injection end, the gas inlet being configured to communicate with a gas storage container, and the gas injection end being configured to communicate with the inner cavity of the housing, where the gas storage container stores target gas, the target gas being soluble in the electrolyte.

14 Claims, 4 Drawing Sheets

(58) Field of Classification Search

CPC .... H01M 4/622; H01M 4/623; H01M 4/0409; H01M 50/426; H01M 10/0565; H01M 4/0435; H01M 4/62; H01M 6/181; H01M 10/0525; H01M 6/188; Y02E 60/10; Y02P 70/50; Y10T 29/49115; Y10T 29/49108; Y10T 29/53135

USPC .............................................................. 141/5

See application file for complete search history.

(56) References Cited

U.S. PATENT DOCUMENTS

| | | | | |
|---|---|---|---|---|
| 2003/0064280 | A1* | 4/2003 | Morizane ............ | H01M 50/627<br>429/71 |
| 2005/0275380 | A1 | 12/2005 | McCall et al. | |
| 2013/0081264 | A1* | 4/2013 | Egusa ................. | H01M 10/058<br>29/623.5 |
| 2018/0076479 | A1* | 3/2018 | Kawasaki ............ | H01M 50/44 |
| 2018/0080711 | A1* | 3/2018 | Ho ...................... | H01M 4/0404 |
| 2018/0301743 | A1* | 10/2018 | Nulman ................. | H01G 11/80 |
| 2021/0313611 | A1* | 10/2021 | Rustomji ............ | H01M 10/052 |

FOREIGN PATENT DOCUMENTS

| | | | |
|---|---|---|---|
| CN | 103050657 | A | 4/2013 |
| CN | 208507813 | U | 2/2019 |
| CN | 209485018 | U | 10/2019 |
| CN | 209691841 | U | 11/2019 |
| CN | 214043941 | U | 8/2021 |
| JP | 2007-335181 | A | 12/2007 |
| WO | 2021/033697 | A1 | 2/2021 |

OTHER PUBLICATIONS

Office Action issued Jun. 28, 2024 in Chinese Patent Application No. 202111215135.6 with English translation thereof.

* cited by examiner

ELECTROLYTE INJECTION APPARATUS AND ELECTROLYTE INJECTION METHOD

CROSS-REFERENCE TO RELATED APPLICATIONS

This application is a Continuation of International Application No. PCT/CN2022/124087, filed on Oct. 9, 2022, which claims priority to Chinese patent application No. 202111215135.6, filed on Oct. 19, 2021, entitled "ELECTROLYTE INJECTION APPARATUS AND ELECTROLYTE INJECTION METHOD", each are incorporated herein by reference in its entirety.

TECHNICAL FIELD

This application relates to the field of battery manufacturing technologies, and in particular, to an electrolyte injection apparatus and an electrolyte injection method.

BACKGROUND

A battery cell typically includes a housing, an electrode assembly, and an electrolyte. The electrode assembly and the electrolyte are both provided in the housing, and the electrolyte is configured to infiltrate the electrode assembly. During the battery manufacturing process, the electrolyte needs to be injected into the housing containing the electrode assembly by using an electrolyte injection apparatus. As the energy density of the battery increases, the density of the electrode assembly becomes higher. This makes it more difficult for the electrolyte to fully infiltrate the electrode assembly, resulting in a low speed at which the electrolyte flows into the housing and a decrease in injection efficiency.

In some cases, to improve the electrolyte injection efficiency, the gas inside the housing is extracted before the electrolyte injection, so that the gas pressure in the housing is reduced, thereby accelerating the speed at which the electrolyte flows into the housing. However, due to incomplete gas extraction from the housing, the injection efficiency remains low.

SUMMARY

In view of the foregoing problem, embodiments of this application provide an electrolyte injection apparatus and an electrolyte injection method that can enhance the electrolyte injection efficiency.

According to an aspect of the embodiments of this application, an electrolyte injection apparatus is provided and configured to inject electrolyte into a housing of a battery cell, where the electrolyte injection apparatus includes: an electrolyte injection assembly having an electrolyte injection end, the electrolyte injection end being configured to communicate with an inner cavity of the housing; a gas extraction assembly having a gas extraction end, the gas extraction end being configured to communicate with the inner cavity of the housing; and a gas injection assembly having a gas inlet and a gas injection end, the gas inlet being configured to communicate with a gas storage container, and the gas injection end being configured to communicate with the inner cavity of the housing, where the gas storage container stores target gas, the target gas being soluble in the electrolyte.

In the foregoing solution, when the electrolyte injection apparatus provided in the embodiments of this application is used to inject the electrolyte into the housing, first, the target gas is introduced into the housing by using the gas injection assembly, the target gas replacing the air in the housing, and then the gas in the housing is extracted by using the gas extraction assembly. At this time, the gas in the housing is mainly the target gas. Then the electrolyte is injected into the housing by using the electrolyte injection assembly. In the electrolyte injection process, even though there is residual target gas in the housing, since the target gas is soluble in the electrolyte, the residual gas has relatively small resistance to the electrolyte injection process, thereby improving the efficiency of electrolyte injection.

In some embodiments, solubility of the target gas in the electrolyte is greater than 0.1. The high solubility of the target gas in the electrolyte results in less resistance to the process of injecting electrolyte into the housing and infiltrating the electrode assembly, enhancing the injection efficiency of electrolyte and preventing incomplete wetting of the electrode assembly by the electrolyte, which may affect the charging and discharging performance of the battery cell.

In some embodiments, the target gas is $CO_2$ gas or CO gas. $CO_2$ or CO are easy-to-produce and low-cost gases that are soluble in the electrolyte, reducing the cost of electrolyte injection.

In some embodiments, the target gas is a dry gas. Introducing a dry gas into the housing does not affect the concentration ratio of the electrolyte, ensuring the electrochemical performance of the battery cell after electrolyte injection.

In some embodiments, the gas injection assembly further includes a pressure regulating valve provided between the gas inlet and the gas injection end. The pressure regulating valve adjusts the gas flow speed at the gas injection end, thereby controlling the speed at which the gas flows into the housing, and achieving control over the internal gas pressure of the housing.

According to another aspect of the embodiments of this application, an electrolyte injection method is provided, where the electrolyte injection method injects electrolyte into a housing of a battery cell by using the electrolyte injection apparatus in the foregoing embodiments, and the method includes: injecting the target gas into the housing by using the gas injection assembly; extracting gas from within the housing by using the gas extraction assembly; and injecting electrolyte into the housing by using the electrolyte injection assembly. The target gas is injected into the housing, replacing the air in the housing. Then, the target gas in the housing is extracted. After the gas in the housing is extracted, even though there is residual target gas in the housing, since the target gas is soluble in the electrolyte, the residual target gas has relatively small resistance to the electrolyte injection process, thereby improving the efficiency of electrolyte injection.

In some embodiments, before the injecting the target gas into the housing by using the gas injection assembly, the method further includes: extracting gas in the housing by using the gas extraction assembly. Before injection of the target gas, the extracted gas is gas in the housing. The gas is extracted so as to form a negative pressure in the housing to facilitate injection of the target gas. After injection of the target gas, the target gas is the main gas in the housing. After the target gas is extracted, a negative pressure is formed in the housing to facilitate injection of the electrolyte.

In some embodiments, in the process of injecting electrolyte into the housing by using the electrolyte injection assembly, the method further includes: controlling gas pressure within the housing by using a pressure regulating valve so that the gas pressure within the housing is lower than gas pressure within the electrolyte injection assembly. Since the gas pressure in the housing is lower than the gas pressure in the electrolyte injection container, the flow of the electrolyte from the electrolyte injection container to the housing is accelerated under the gas pressure in the electrolyte injection container, thereby enhancing the efficiency of electrolyte injection.

In some embodiments, the injecting electrolyte into the housing by using the electrolyte injection assembly includes: injecting gas into the electrolyte injection assembly so that gas pressure in the housing is lower than gas pressure in the electrolyte injection assembly. Injecting gas into the electrolyte injection container can increase the gas pressure in the electrolyte injection container so that the gas pressure in the housing is lower than the gas pressure in the electrolyte injection container. In addition, in the process of injecting the electrolyte, the speed of injecting the gas into the electrolyte injection container can be flexibly adjusted, so that the difference in gas pressure between the electrolyte injection container and the housing can be adjusted in real time. This pressure control method is relatively simple to implement and the implementation is flexible and controllable.

In some embodiments, before injecting the electrolyte into the housing by using the electrolyte injection assembly, the method further includes: drying an electrode assembly in the battery cell. The electrode assembly may absorb moisture from the surrounding environment during the manufacturing process, and this moisture, when mixed into the electrolyte, may affect the composition ratio of the electrolyte. Drying the electrode assembly before electrolyte injection can reduce the moisture content in the electrode assembly, thereby reducing the effect of moisture on the composition ratio of the electrolyte and stabilizing the electrochemical performance of the battery cell.

In some embodiments, the drying an electrode assembly in the battery cell includes: placing the battery cell in an oven; extracting gas from within the oven by using the gas extraction assembly; and injecting the target gas into the oven by using the gas injection assembly. In the process of drying the electrode assembly, water in the electrode assembly evaporates into water vapor. In the process of extracting the gas in the oven, the gas containing water vapor is extracted. Then, the target gas is injected into the oven, replacing the moist gas in the oven and that in the housing of the battery cell. This prevents the gas containing water vapor from staying in the housing, which may affect the effect of the drying of the electrode assembly.

The foregoing description is merely an overview of the technical solutions in the embodiments of this application. For better understanding of the technical means in the embodiments of this application so that they can be implemented according to content of the specification, and to make the above and other objects, features, and advantages of the embodiments of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

DESCRIPTION OF REFERENCE SIGNS

Figure 1:
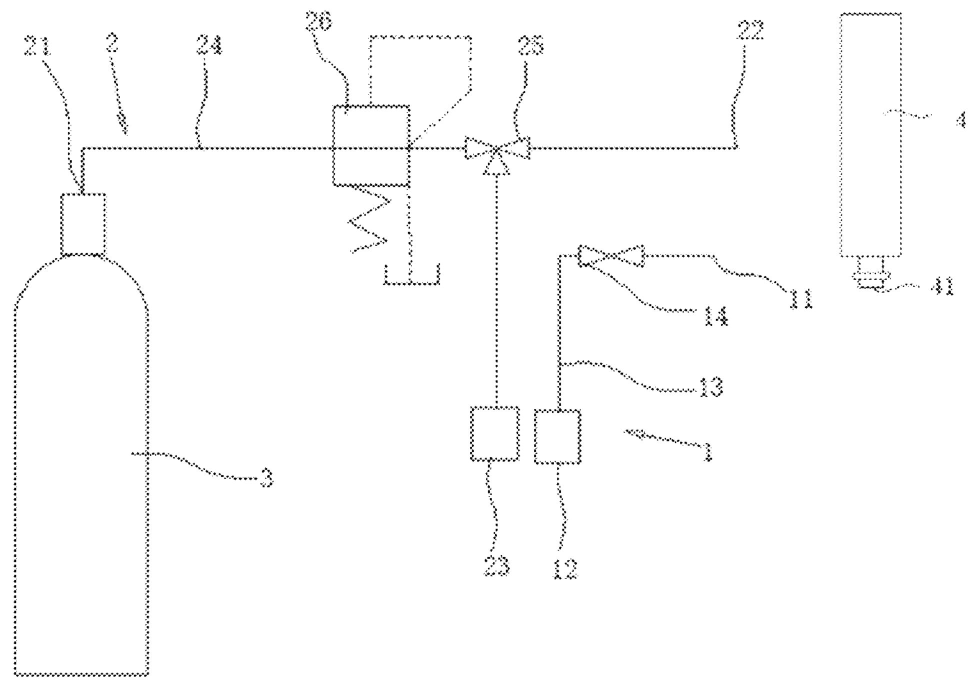
FIG. 1 is a structural sketch of an electrolyte injection apparatus according to an embodiment of this application.

1. gas extraction assembly; 11. gas extraction end; 12. gas extraction pump; 13. gas extraction pipeline; 14. gas extraction valve; 2. gas injection assembly; 21. gas inlet; 22. gas injection end; 23. gas delivery pump; 24. gas delivery pipeline; 25. gas delivery valve; 26. pressure regulating valve; 3. gas storage container; 4. electrolyte injection assembly; 41. electrolyte injection end; 5. battery cell; and 6. oven.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application without creative efforts shall fall within the protection scope of this application.

Unless otherwise defined, meanings of all technical and scientific terms used in this specification are the same as those commonly understood by persons skilled in the art of this application. The terms used in this specification of this application are merely intended to describe specific embodiments, but not to limit this application.

The terms "comprise", "include", and any variants thereof in the descriptions of the specification, claims, and accompanying drawings of this application are intended to cover a non-exclusive inclusion. The word "a" or "an" does not exclude existence of more than one.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

The orientation terms appearing in the following description all are directions shown in the figures, and do not limit the specific structure of the electrolyte injection apparatus of the application. For example, in the descriptions of this application, the orientations or positional relationships indicated by the terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of descriptions of this application rather than indicating or implying that the apparatuses or components mentioned must have specific orientations or must be constructed or manipulated according to specific orientations, and therefore shall not be construed as any limitations on this application.

In the descriptions of this application, unless otherwise specified, the term "a plurality of" means more than two (inclusive). Similarly, "a plurality of groups" means more than two (inclusive) groups.

In the descriptions of this application, it should be noted that, unless otherwise specified and defined explicitly, the terms "mounting", "connection", and "join" should be understood broadly. For example, the "connection" or "join" of mechanical structures may refer to a physical connection. For example, the physical connection may be a fixed connection, for example, fixed connection using a fixing member such as screw or bolt; or the physical connection may be a detachable connection, for example, connection by snap-fitting or engagement; or the physical connection may be an integral connection, for example, connection by welding, bonding, or integral forming. The "connection" or "join" of circuit structures may refer to a physical connection, or an electrical or signal connection. For example, the connection may be a direct connection, that is, physical connection, or an indirect connection via at least one element in between as long as circuit continuity is established, or internal communication between two elements. The signal connection may be a signal connection via a circuit or a signal connection via a medium, such as a radio wave. Persons of ordinary skill in the art can understand specific meanings of these terms in this application as appropriate to specific situations.

A battery cell typically includes a housing, an electrode assembly, and an electrolyte, the housing having an inner cavity. The electrode assembly and the electrolyte are both provided in the inner cavity of the housing, and the electrolyte is configured to infiltrate the electrode assembly. During the battery manufacturing process, the electrode assembly is first placed in the housing, then the electrolyte is injected into the inner cavity having the housing by using an electrolyte injection apparatus. As the energy density of the battery increases, the density of the electrode assembly also increases. This makes it more difficult for the electrolyte to fully infiltrate the electrode assembly, resulting in a low speed at which the electrolyte flows into the housing and a decrease in injection efficiency.

In related technologies, to improve the electrolyte injection efficiency, the gas inside the housing is extracted before the electrolyte injection, so that the gas pressure in the housing is lower than atmospheric pressure. During the electrolyte injection process, after the electrolyte injection apparatus is connected to the electrolyte injection hole on the housing, because the pressure inside the housing is lower, the flow of the electrolyte into the housing accelerates under the effect of negative pressure.

However, after the foregoing technical solution is adopted, the electrolyte infiltration speed is improved to some extent only at the initial stage of electrolyte injection. As the pressure inside the housing increases, the speed at which the electrolyte flows into the housing returns to a slow speed, and the injection efficiency is still low.

The applicant has found through research that this is due to the fact that at the initial stage of electrolyte injection, the negative pressure inside the housing can draw the electrolyte into the housing, but as the electrolyte continues to be injected, the injection speed of electrolyte depends more on the infiltration speed of the electrolyte into the electrode assembly. The faster the infiltration speed, the faster the electrolyte flows in; the slower the infiltration speed, the slower the electrolyte flows in. When there is a significant amount of gas between the tab layers of the electrode assembly, the gas hinders the infiltration of the electrolyte, resulting in a slower electrolyte infiltration speed. It is difficult to completely remove the gas filled between the tab layers, leading to limited improvement in the electrolyte injection efficiency.

In view of this, embodiments of this application provide an electrolyte injection apparatus and an electrolyte injection method, where target gas is injected into the housing of a battery cell by using a gas injection assembly, replacing the original gas in the housing. Then, the gas in the housing is extracted by using a gas extraction assembly. At this time, the gas remaining in the housing is mainly a small amount of the target gas. In the process of electrolyte injection, since the target gas is soluble in the electrolyte, the target gas has relatively small resistance to the electrolyte, so that the electrolyte can quickly infiltrate the electrode assembly, accelerating the speed of electrolyte injection into the housing.

FIG. 1 is a structural sketch of an electrolyte injection apparatus according to an embodiment of this application. As shown in FIG. 1, according to one aspect of embodiments of this application, an electrolyte injection apparatus is provided and configured to inject electrolyte into a housing of a battery cell 5. The electrolyte injection apparatus includes: a gas extraction assembly 1, a gas injection assembly 2, and an electrolyte injection assembly 4. The gas extraction assembly 1 has a gas extraction end 11. The gas extraction end 11 is configured to communicate with an inner cavity of the housing for extracting gas in the housing. The gas injection assembly 2 has a gas inlet 21 and a gas injection end 22. The gas inlet 21 is configured to communicate with a gas storage container 3, and the gas injection end 22 is configured to communicate with the inner cavity of the housing for injecting target gas in the gas storage container 3 to the housing. The gas storage container 3 stores the target gas. The target gas is soluble in the electrolyte. The electrolyte injection assembly 4 has an electrolyte injection end 41. The electrolyte injection end 41 is configured to communicate with the inner cavity of the housing.

The gas extraction assembly 1 extracts the gas in the housing to reduce the gas pressure in the housing to a negative pressure state, which facilitates the injection of gas or liquid into the housing. The gas extracted by the gas extraction assembly 1 may be air, target gas, or other mixed or pure gases, which is not limited by the embodiments of this application. Furthermore, the gas extraction assembly 1 may be used for gas extraction operation at any stage during the electrolyte injection process, depending on the actual situation, without affecting the structure and function of the gas extraction assembly 1 in the embodiments of this application.

In addition, the gas extraction assembly 1 can extract gas from the housing either by connecting the gas extraction end 11 directly to the housing of the battery cell 5 to extract the gas in the housing, or by connecting the gas extraction end 11 of the gas extraction assembly 1 to another medium to extract the gas in the housing.

For example, as shown in FIG. 1, in some embodiments, the gas extraction assembly 1 includes a gas extraction pump 12, a gas extraction pipeline 13, and a gas extraction valve 14 connected to the gas extraction pipeline 13. The end of the gas extraction pipeline 13 that is away from the gas extraction pump 12 is the gas extraction end 11. During use, the gas extraction end 11 is connected to a component that needs to be pumped, and the gas extraction pump 12 and the gas extraction valve 14 are turned on to pump the gas. After gas extraction is completed, the gas extraction pump 12 and the gas extraction valve 14 are turned off.

The gas injection assembly 2 injects the target gas in the gas storage container 3 into the housing, so that the target gas replaces the original gas in the housing. Since the target gas is soluble in the electrolyte, the target gas has no or only small resistance to the infiltration of the electrolyte during the electrolyte injection process. This accelerates the infiltration of the electrolyte and improves the efficiency of electrolyte injection.

Similarly, the gas injection assembly 2 can inject gas into the housing of the battery cell 5 in a way that the gas injection end 22 of the gas injection assembly 2 is directly connected to the battery cell 5 and the target gas is injected into the housing of the battery cell 5; or in a way that the gas injection end 22 of the gas injection assembly 2 is in communication with a space where the battery cell 5 is located and the gas injection assembly 2 injects the target gas into the space where the battery cell 5 is located, so that the target gas flows into the housing of the battery cell 5 from that space.

For example, as shown in FIG. 1, in some embodiments, the gas injection assembly 2 includes a gas delivery pump 23, a gas delivery pipeline 24, and a gas delivery valve 25 connected to the gas delivery pipeline 24. One end of the gas delivery pipeline 24 is the gas inlet 21 and the other end is the gas injection end 22, with the gas inlet 21 connected to the gas storage container 3. During use, the gas injection end 22 is connected to a component into which gas needs to be injected, the gas delivery pump 23 and the gas delivery valve 25 are turned on, and the target gas in the gas storage container 3 is delivered along the gas delivery pipeline 24 to the gas injection end 22 and injected into the component that is connected to the gas injection end 22. After the target gas injection is completed, the gas delivery pump 23 and the gas delivery valve 25 are turned off.

Figure 2:
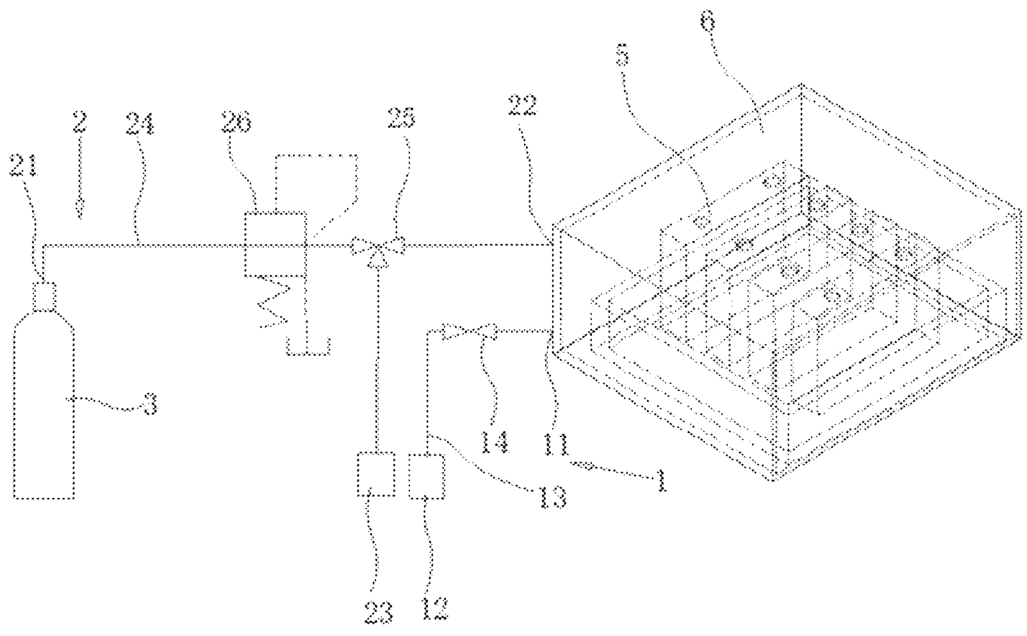
FIG. 2 is a use state sketch of an electrolyte injection apparatus according to an embodiment of this application.

FIG. 2 is a use state sketch of the electrolyte injection apparatus according to an embodiment of this application. As shown in FIG. 2, in one possible state of use, a plurality of battery cells 5 are placed in a relatively closed space, such as an oven 6. When it is necessary to extract the gas inside the housing, the gas extraction end 11 of the gas extraction assembly 1 is put into communication with the enclosed space to extract the gas inside the enclosed space, and thus the gas inside the housings of all the battery cells 5 located in the enclosed space is extracted. Similarly, when it is necessary to inject the target gas, the gas injection end 22 of the gas injection assembly 2 is put into communication with the enclosed space and the target gas is introduced into the enclosed space, and then the target gas flows from the enclosed space into the housing.

Figure 3:
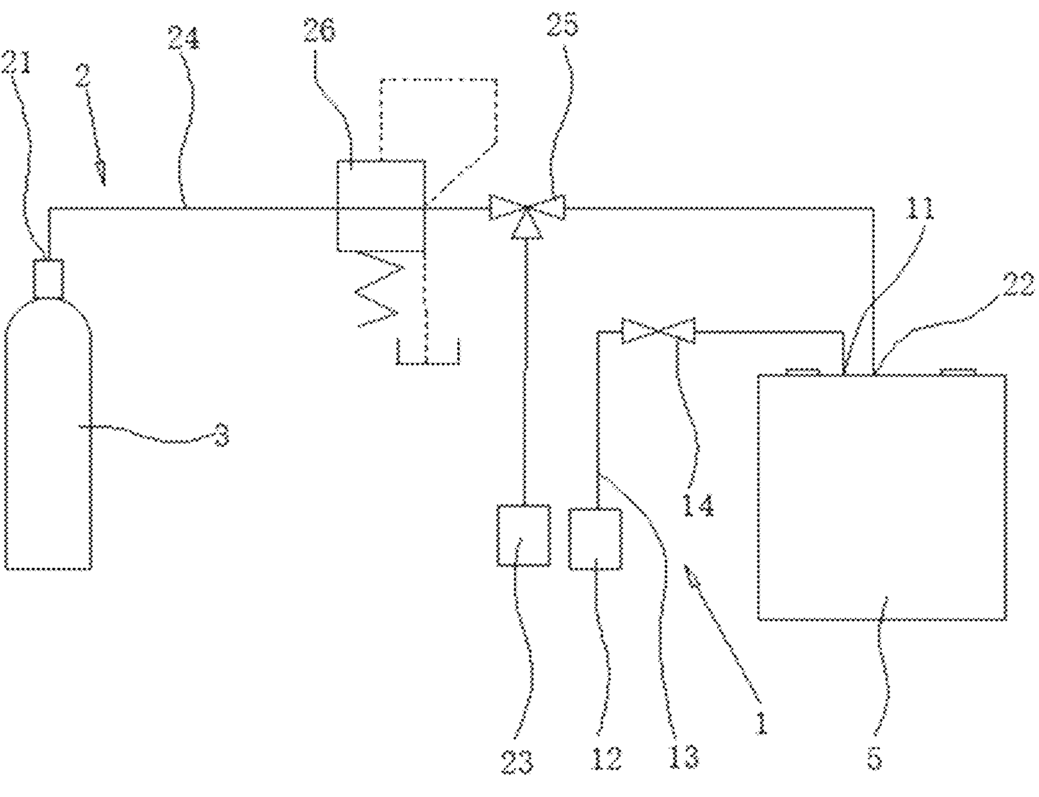
FIG. 3 is another use state sketch of an electrolyte injection apparatus according to an embodiment of this application.

FIG. 3 is another use state sketch of the electrolyte injection apparatus according to an embodiment of this application. As shown in FIG. 3, in another possible state of use, the gas extraction end 11 of the gas extraction assembly 1 is directly connected to the housing of the battery cell 5 to extract the gas inside the housing. Similarly, when it is necessary to inject the target gas, the gas injection end 22 of the electrolyte injection assembly is directly connected to the housing of the battery cell 5 to inject the target gas into the housing of the battery cell 5.

In an implementation of this embodiment of this application, the electrolyte injection assembly 4 may be an electrolyte injection container, simplifying the structure of the electrolyte injection assembly 4.

When the electrolyte injection apparatus provided in the embodiments of this application is used, the target gas can be injected into the inner cavity of the housing by using the gas injection assembly 2, the target gas replacing the original gas in the inner cavity of the housing. Then, the gas in the inner cavity of the housing is extracted by using the gas extraction assembly 1. At this time, the gas remaining in the housing is mainly a small amount of the target gas. Finally, the electrolyte is injected into the housing by using the electrolyte injection assembly 4. In the process of electrolyte injection, since the target gas is soluble in the electrolyte, the target gas has relatively small resistance to the electrolyte, thereby accelerating the speed of electrolyte injection into the housing and improving the efficiency of electrolyte injection.

In some embodiments, solubility of the target gas in the gas storage container 3 in the electrolyte is greater than 0.1.

In the foregoing solution, the high solubility of the target gas in the electrolyte results in less resistance to the process of injecting the electrolyte into the housing and infiltrating the electrode assembly, enhancing the injection efficiency of electrolyte and preventing incomplete wetting of the electrode assembly by the electrolyte, which may affect the charging and discharging performance of the battery cell 5.

In some embodiments, the target gas in the gas storage container 3 includes either one of carbon dioxide ($CO_2$) gas or carbon monoxide (CO) gas.

For example, the target gas is $CO_2$ gas; or the target gas is CO gas; or the target gas is a mixture of $CO_2$ gas and CO gas.

In the foregoing solution, $CO_2$ or CO is an easy-to-produce and low-cost gas that is soluble in the electrolyte, reducing the cost of electrolyte injection.

In some embodiments, the target gas is a dry gas. For example, the target gas is a dry $CO_2$ gas; the target gas is a dry CO gas; or the target gas is a mixture of dry $CO_2$ gas and dry CO gas.

Introducing a dry gas into the housing does not affect the concentration ratio of the electrolyte, ensuring the electrochemical performance of the battery cell 5 after electrolyte injection.

As shown in FIGS. 2 and 3, in some embodiments, the gas injection assembly 2 further includes a pressure regulating valve 26. The pressure regulating valve 26 is disposed between the gas inlet 21 and the gas injection end 22, and the pressure regulating valve 26 is configured to control the speed of gas flow out of the gas injection end 22.

In the foregoing solution, the pressure regulating valve 26 adjusts the speed of gas flow out of the gas injection end 22, thereby controlling the speed at which the gas flows into the housing, and achieving control over the internal gas pressure of the housing. When the gas inflow speed is high, the gas pressure in the housing increases rapidly, resulting in a relatively high pressure in the housing. When the gas inflow speed is low, the gas pressure in the housing increases slowly, resulting in a relatively low pressure.

According to another aspect of embodiments of this application, an electrolyte injection method is provided by the embodiments of this application, where the electrolyte injection method injects electrolyte into a housing of a battery cell by using the foregoing electrolyte injection apparatus.

Figure 4:
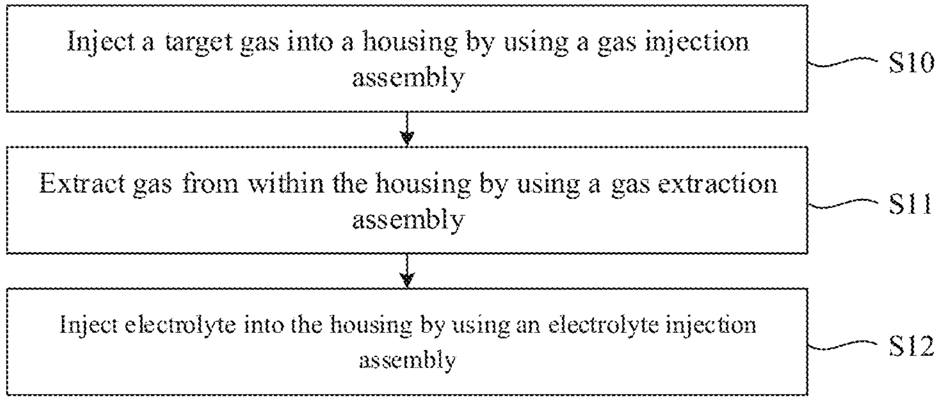
FIG. 4 is a flowchart of an electrolyte injection method according to an embodiment of this application.

FIG. 4 is a flowchart of an electrolyte injection method according to an embodiment of this application. As shown in FIG. 4, in some embodiments, the electrolyte injection method includes:

- S10: Inject target gas into the housing by using the gas injection assembly;
- S11: Extract gas from within the housing by using the gas extraction assembly; and
- S12: Inject electrolyte into the housing by using the electrolyte injection assembly;

where the target gas is a gas soluble in the electrolyte.

In the foregoing solution, the target gas is injected into the housing to replace the air in the housing. Then, the target gas in the housing is extracted. After the gas in the housing is extracted, even though there is residual target gas in the housing, since the target gas is soluble in the electrolyte, the residual target gas has relatively small resistance to the electrolyte injection process, thereby improving the efficiency of electrolyte injection.

Figure 5:
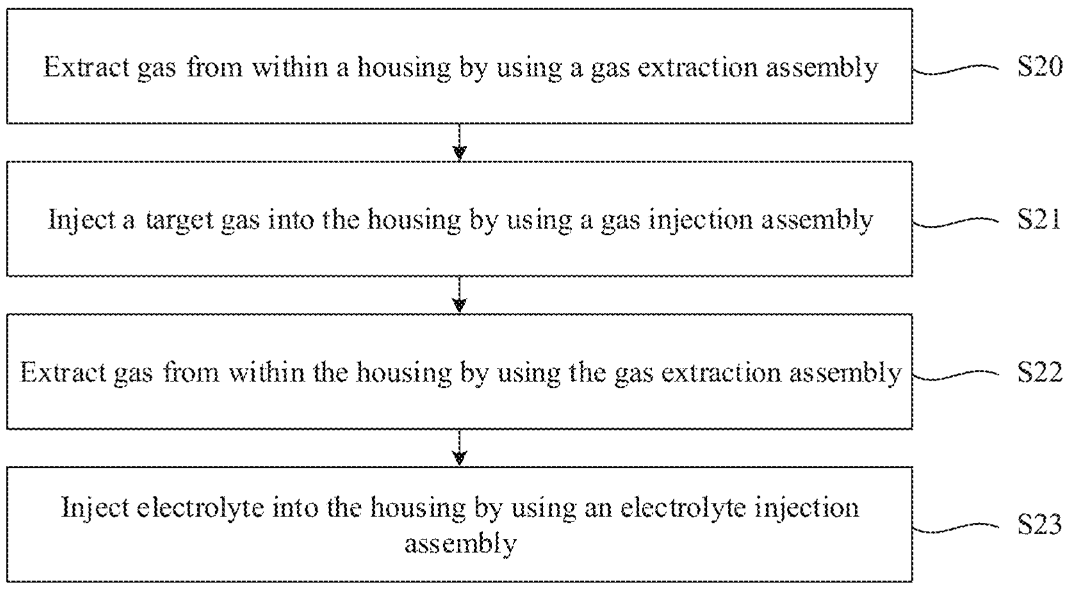
FIG. 5 is a flowchart of an electrolyte injection method according to another embodiment of this application.

FIG. 5 is a flowchart of an electrolyte injection method according to another embodiment of this application. As shown in FIG. 5, the electrolyte injection method includes:

- S20: Extract gas from within the housing by using the gas extraction assembly;
- S21: Inject target gas into the housing by using the gas injection assembly;
- S22: Extract gas from within the housing by using the gas extraction assembly; and
- S23: Inject electrolyte into the housing by using the electrolyte injection assembly.

In the foregoing solution, before injection of the target gas, the gas in the housing is extracted so as to form a negative pressure in the housing to facilitate injection of the target gas. After injection of the target gas, the target gas is the main gas in the housing. After the target gas is extracted, a negative pressure is formed in the housing to facilitate injection of the electrolyte.

In some embodiments, in the process of injecting the electrolyte into the housing by using the electrolyte injection assembly, the electrolyte injection method further includes: controlling gas pressure in the housing by using a pressure regulating valve so that the gas pressure in the housing is lower than gas pressure in the electrolyte injection assembly to accelerate the speed at which the electrolyte in the electrolyte injection assembly 4 flows into the housing.

There are three ways to control the gas pressure in the housing to be lower than the gas pressure in the electrolyte injection assembly 4. One way is to increase the gas pressure in the electrolyte injection assembly 4. Another way is to decrease the pressure in the housing. A third way is to increase the pressure in the electrolyte injection assembly 4 while decreasing the pressure in the housing. This is not limited in this embodiment of this application.

Since the gas pressure in the housing is lower than the gas pressure in the electrolyte injection assembly 4, the flow of the electrolyte from the electrolyte injection assembly 4 to the housing is accelerated under the gas pressure in the electrolyte injection assembly 4, thereby enhancing the efficiency of electrolyte injection.

For example, in some embodiments, the injecting electrolyte into the housing includes: injecting gas into the electrolyte injection assembly 4 to control the gas pressure in the housing to be lower than the gas pressure in the electrolyte injection assembly 4.

Figure 6:
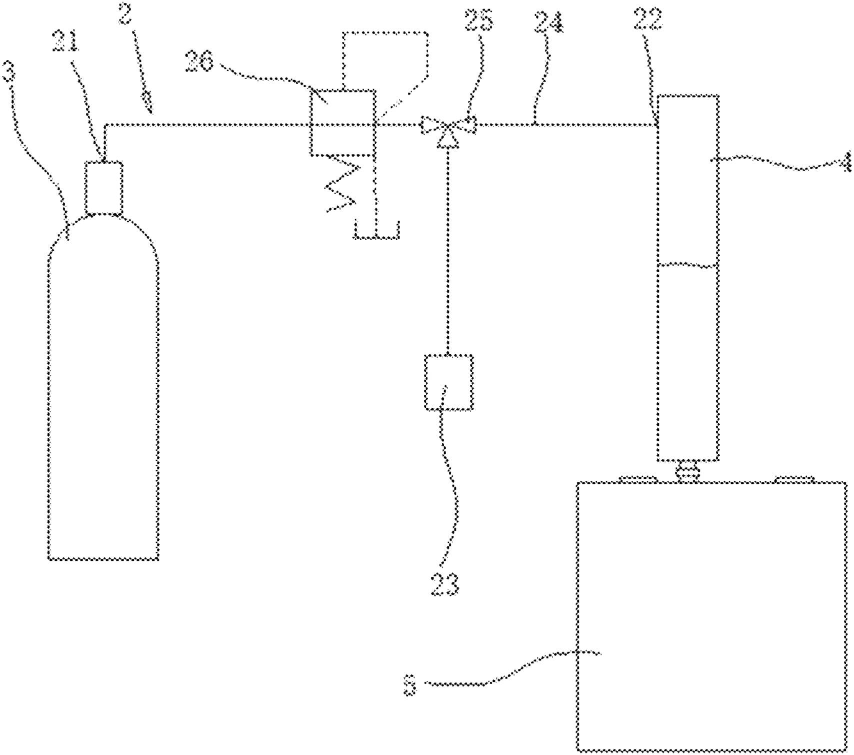
FIG. 6 is a structural sketch of using a gas injection assembly to inject gas into an electrolyte injection container according to an embodiment of this application.

The gas introduced to the electrolyte injection assembly 4 may be the foregoing target gases or other gases. For example, FIG. 6 is a structural sketch of using a gas injection assembly to inject gas into an electrolyte injection container according to an embodiment of this application. As shown in FIG. 6, the gas injection end 22 of the gas injection assembly 2 of the foregoing embodiment can be connected to the electrolyte injection assembly 4 to inject the gas in the gas storage container 3 into the electrolyte injection assembly 4 to increase the gas pressure in the electrolyte injection assembly 4.

In the foregoing solution, injecting gas into the electrolyte injection assembly 4 can increase the gas pressure in the electrolyte injection assembly 4 so that the gas pressure in the housing is lower than the gas pressure in the electrolyte injection assembly 4. In addition, in the process of injecting the electrolyte, the speed of injecting the gas into the electrolyte injection assembly 4 can be flexibly adjusted, so that the difference in gas pressure between the electrolyte injection assembly 4 and the housing can be adjusted in real time. This pressure control method is relatively simple to implement and the implementation is flexible and controllable.

Figure 7:
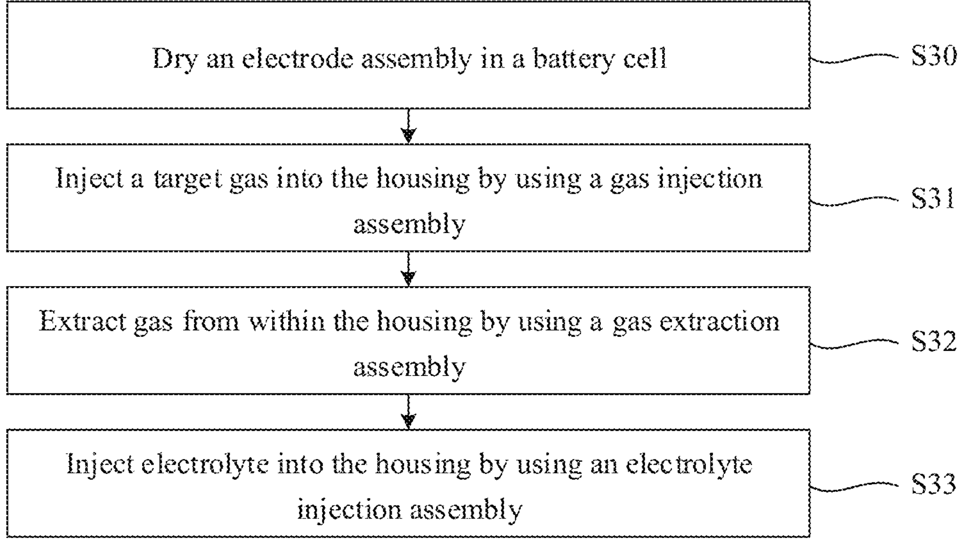
FIG. 7 is a flowchart of an electrolyte injection method according to another embodiment of this application.

FIG. 7 is a flowchart of an electrolyte injection method according to another embodiment of this application. As shown in FIG. 7, the electrolyte injection method includes:

- S30: Dry an electrode assembly in the battery cell;
- S31: Inject the target gas into the housing by using the gas injection assembly;
- S32: Extract gas from within the housing by using the gas extraction assembly; and
- S33: Inject electrolyte into the housing by using the electrolyte injection assembly.

The device used for drying may be an oven 6 or the like. The battery cell 5 is placed in the oven 6, and the oven 6 may be kept enclosed during the process of drying the battery cell 5 to minimize heat loss.

The electrode assembly may absorb moisture from the surrounding environment during the manufacturing process, and this moisture, when mixed into the electrolyte, may affect the composition ratio of the electrolyte. Drying the electrode assembly before electrolyte injection can reduce the moisture content in the electrode assembly, thereby reducing the effect of moisture on the composition ratio of the electrolyte and stabilizing the electrochemical performance of the battery cell 5.

Figure 8:
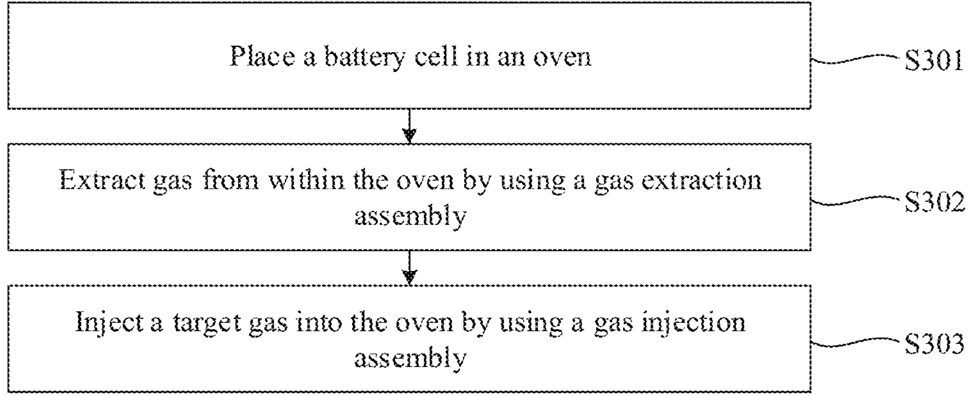
FIG. 8 is a flowchart of a method for drying an electrode assembly of a battery cell according to an embodiment of this application.

FIG. 8 is a flowchart of a method for drying an electrode assembly of a battery cell according to an embodiment of this application. As shown in FIG. 8, in some embodiments, S30 includes:

- S301: Place the battery cell in an oven;
- S302: Extract gas from within the oven by using the gas extraction assembly; and S303: Inject the target gas into the oven by using the gas injection assembly.

In this step, the gas in the oven 6 can be extracted by using the gas extraction assembly 1 in the foregoing embodiments, and the target gas can be injected into the oven 6 by using the gas injection assembly 2 in the foregoing embodiments. The operational state of the drying process is as shown in FIG. 2, which has been described in the foregoing embodiment about the electrolyte injection apparatus. To avoid repetition, details are not described in this embodiment of this application again.

In addition, during the process of drying the electrode assembly of the battery cell 5, the foregoing steps S301 and S302 may be circulated for a plurality of times, thereby ensuring that the water vapor in the housing of the battery cell 5 can be extracted thoroughly.

In the foregoing solution, in the process of drying the electrode assembly, the water in the electrode assembly evaporates into water vapor. In the process of extracting the gas in the oven 6, the gas containing water vapor is extracted. Then, the target gas is injected into the oven 6, replacing the moist gas in the oven 6 and that in the housing of the battery cell 5. This prevents the gas containing water vapor from staying in the housing affecting the effect of the drying of the electrode assembly.

It should be noted that in the foregoing various embodiments of the electrolyte injection method, both the step of injecting the target gas into the housing and the step of extracting gas from the housing of the battery cell 5 can be carried out cyclically one or more times, so that the gas in the housing of the battery cell 5 is replaced by the target gas as thoroughly as possible, avoiding the residue of gas insoluble in the electrolyte in the housing of the battery cell 5 affecting the injection efficiency of electrolyte.

The foregoing protection subjects of this application and the features in the embodiments can be mutually referenced. Those skilled in the art can also flexibly combine the technical features in the different embodiments to form more embodiments if the structure permits.

In summary, in the embodiments of this application, before the electrolyte is injected into the housing, the target gas is introduced into the housing by using the gas injection assembly 2, the target gas replacing the air in the housing, and then the gas in the housing is extracted by using the gas extraction assembly 1. Finally, the electrolyte is injected into the housing. In the electrolyte injection process, even though there is residual target gas in the housing, since the target gas is soluble in the electrolyte, the residual gas has relatively small resistance to the electrolyte injection process, thereby improving the efficiency of electrolyte injection.

Persons skilled in the art can understand that, although some of the embodiments described herein include some features included in other embodiments, combinations of features of different embodiments are meant to be within the scope of this application and form different embodiments. For example, in the claims, any one of the claimed embodiments may be used in any combination.

The foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. An electrolyte injection apparatus, configured to inject electrolyte into a housing of a battery cell, wherein the electrolyte injection apparatus comprises:

an electrolyte injection assembly having an electrolyte injection end, the electrolyte injection end being configured to communicate with an inner cavity of the housing;

a gas extraction assembly having a gas extraction end, the gas extraction end being configured to communicate with the inner cavity of the housing and place the inner cavity of the housing in a negative pressure state; and a gas injection assembly having a gas inlet and a gas injection end, the gas inlet being configured to communicate with a gas storage container that stores a target gas, and the gas injection end being configured to communicate with the inner cavity of the housing and provide the target gas to the inner cavity of the housing;

wherein the gas storage container stores target gas, the target gas being soluble in the electrolyte, wherein the gas extraction end is directly connected to the housing at a location that is different from a location at which the gas injection end is connected to the housing.

2. The electrolyte injection apparatus according to claim 1, wherein a solubility of the target gas in the electrolyte is greater than 0.1.

3. The electrolyte injection apparatus according to claim 1, wherein the target gas comprises either one of $CO_2$ gas or CO gas.

4. The electrolyte injection apparatus according to claim 1, wherein the target gas is a dry gas.

5. The electrolyte injection apparatus according to claim 1, wherein the gas injection assembly further comprises:

a pressure regulating valve provided between the gas inlet and the gas injection end.

6. An electrolyte injection method, wherein the electrolyte injection method injects an electrolyte into a housing of a battery cell by using an electrolyte injection apparatus that includes an electrolyte injection assembly having an electrolyte injection end, the electrolyte injection end being configured to communicate with an inner cavity of the housing; a gas extraction assembly having a gas extraction end, the gas extraction end being configured to communicate with the inner cavity of the housing; and a gas injection assembly having a gas inlet and a gas injection end, the gas inlet being configured to communicate with a gas storage container, and the gas injection end being configured to communicate with the inner cavity of the housing; and wherein the gas storage container stores target gas, the target gas being soluble in the electrolyte, and the method comprises:

injecting the target gas into the housing by using the gas injection assembly;

extracting the target gas from within the housing by using the gas extraction assembly; and injecting the electrolyte into the housing by using the electrolyte injection assembly.

7. The electrolyte injection method according to claim 6, wherein:

injecting the target gas into the housing replaces air in the housing, after extracting gas from within the housing, some target gas remains in the housing, and the presence of the target gas in the housing while injecting the electrolyte into the housing prevents incomplete wetting of an electrode assembly by the electrolyte.

8. The electrolyte injection method according to claim 6, before the injecting the target gas into the housing by using the gas injection assembly, the method further comprising:

extracting gas from within the housing by using the gas extraction assembly.

9. The electrolyte injection method according to claim 6, wherein:

the gas injection assembly further comprises a pressure regulating valve provided between the gas inlet and the gas injection end, and during the process of injecting electrolyte into the housing by using the electrolyte injection assembly, the method further comprises:

controlling gas pressure within the housing by using the pressure regulating valve such that the gas pressure within the housing is lower than gas pressure within the electrolyte injection assembly.

10. The electrolyte injection method according to claim 6, wherein the injecting electrolyte into the housing by using the electrolyte injection assembly comprises:

injecting gas into the electrolyte injection assembly such that gas pressure within the housing is lower than gas pressure within the electrolyte injection assembly.

11. The electrolyte injection method according to claim 6, wherein:

injecting the target gas into the housing by using the gas injection assembly is performed prior to extracting the target gas from within the housing by using the gas extraction assembly, and extracting the target gas from within the housing by using the gas extraction assembly is performed prior to injecting the electrolyte into the housing by using the electrolyte injection assembly.

12. The electrolyte injection method according to claim 6, wherein before the injecting electrolyte into the housing by using the electrolyte injection assembly, the method further comprises:

drying an electrode assembly in the battery cell.

13. The electrolyte injection method according to claim 12, wherein the drying an electrode assembly in the battery cell comprises:

placing the battery cell in an oven;

extracting gas from within the oven by using the gas extraction assembly; and injecting the target gas into the oven by using the gas injection assembly.

14. The electrolyte injection apparatus according to claim 1, wherein the target gas comprises CO gas.

* * * * *